United States Patent  [19]

Tushaus

[11] 3,718,712
[45] Feb. 27, 1973

[54] PRESSURE-SENSITIVE ADHESIVES BASED ON CYCLIC TERPENE URETHANE RESIN

[75] Inventor: Leonard A. Tushaus, Bloomington, Minn.

[73] Assignee: Minnesota Mining and Manufacturing Company, St. Paul, Minn.

[22] Filed: March 1, 1971

[21] Appl. No.: 119,838

[52] U.S. Cl. ......260/858, 117/138.8 E, 117/161 KP, 206/29, 260/75 NH, 260/77.5 AN, 260/77.5 MA
[51] Int. Cl............................C08g 41/04, C08g 22/16
[58] Field of Search...........260/77.5 AP, 77.5 MA, 2.5 AM, 260/858, 77.5 R, 77.5 AN, 75 TN; 117/161 KP

[56] References Cited

UNITED STATES PATENTS 3,437,622  4/1969  Dahl.....................................260/24
3,463,753  8/1969  Gonzenbach et al...................260/27

FOREIGN PATENTS OR APPLICATIONS 1,050,275  12/1966  Great Britain................260/77.5 AN

*Primary Examiner*—Donald E. Czaja
*Assistant Examiner*—H. S. Cockeram
*Attorney*—Kinney, Alexander, Sell, Steldt & Delahunt

[57] ABSTRACT

Pressure-sensitive polyurethane adhesives having the combined properties of high peel adhesion, quick stick, shear strength, and resistance to hydrocarbon solvents comprise the crosslinked polyurethane reaction product of the in situ reaction of polyhydroxyl terminated polyethers and polyesters with polyisocyanates to provide a product having a molecular weight between crosslinks of about 6,000 to about 40,000 and a urethane group concentration of about 0.7 to 1.3 per 1000 gms of polymer, and tackifier comprising the reaction product of cyclic terpene alcohols and aromatic isocyanates.

24 Claims, No Drawings

PRESSURE-SENSITIVE ADHESIVES BASED ON CYCLIC TERPENE URETHANE RESIN

FIELD OF THE INVENTION

This invention relates to pressure-sensitive polyurethane adhesives and adhesive tapes.

Pressure-sensitive adhesives and adhesive tapes having excellent properties and adhesion to numerous substrates have historically been provided by means of rubber-resin compositions and more recently by means of acrylate polymer compositions. Despite their desirable properties, these adhesives have not combined solvent resistance with high peel adhesion, quick stick, and shear strength. For example, these adhesives have not been suitable for use in environments where they are exposed to organic solvents because those adhesives having adequate peel adhesion, quick stick, and shear strength are not resistant to the solvent, while adhesives having adequate solvent resistance are limited in their applications because they do not have adequate peel adhesion, quick stick, and shear strength.

Certain polyurethane pressure-sensitive adhesives having some resistance to solvents are known in the art. For example, urethane polymers tackified with various non-reactive tackifiers are disclosed in U.S. Pat. Nos. 3,246,049 and 3,437,622. However, these adhesives require relatively long cure times and generally are deficient in one or more adhesion properties.

Other pressure-sensitive polyurethane adhesives are disclosed in British Patent No. 1,113,925; U.S. Pat. No. 2,983,693; and U.S. Pat. No. 3,515,773. These adhesives do not utilize tackifiers and have not been found satisfactory for use as pressure-sensitive adhesives because of their low peel adhesion and quick stick.

SUMMARY OF THE INVENTION

The invention provides pressure-sensitive polyurethane adhesives and adhesive tapes combining the properties of high peel adhesion, quick stick, and shear strength with resistance to hydrocarbon solvents. This combination of properties makes these adhesives particularly adapted for use in environments exposed to hydrocarbon solvents. Adhesive properties can be tailored at will by varying the reaction components to provide a desired balance of properties, such as increased water sensitivity, peel adhesion or quick stick.

In accordance with the invention, pressure-sensitive polyurethane adhesives having the combined properties of high peel adhesion, quick stick, shear strength and resistance to hydrocarbon solvents comprise the crosslinked polyurethane reaction product of the in situ reaction of polyhydroxyl terminated polyethers and polyesters with polyisocyanates to provide a product having a molecular weight between cross-links of about 6,000 to about 40,000, preferably about 6,500 to about 20,000, and a urethane group concentration of about 0.7 to 1.3 per 1,000 gms of polymer, and tackifier comprising the reaction product of cyclic terpene alcohols and aromatic isocyanates.

DETAILED DESCRIPTION OF THE INVENTION

The desirable properties of the pressure-sensitive adhesives of the invention are obtained by combining the described tackifier with a cross-linked polyurethane reaction product. The urethane reaction product, to provide the desired properties, must have a molecular weight between crosslinks of about 6,000 to about 40,000 and a urethane group concentration of about 0.7 to about 1.3 per 1,000 gms of polymer. The molecular weight between crosslinks is the average molecular weight of chains connecting two crosslink sites. This value is two-thirds of the molecular weight per crosslink which is defined as the unit weight of polymer divided by the number of crosslink junctions in the unit weight of polymer. For example, if a polyurethane were prepared from 1,000 grams of reactants, using a stoichiometric ratio of reactants, and 0.25 mole of triol in the 1,000 grams, all other reactants being difunctional, the hypothetical molecular weight per crosslink would be 1,000/0.25 or 4,000. The urethane content is defined as the equivalents of urethane per 1,000 gms. of polymer.

The polyurethane polymers having the above properties may be obtained by several methods. One is to prepare a hydroxyl or isocyanate terminated polyurethane prepolymer and crosslink it with triisocyanate or triol to obtain the final polymer, the triol being utilized to crosslink diisocyanate prepolymers and the triisocyanate being utilized with polyol prepolymers. Useful prepolymers are obtained by reacting at least one polyhydroxy terminated polyether or polyester having a molecular weight of about 400 to about 4,000 preferably about 1,000 to about 3,000 with at least one diisocyanate to provide a urethane prepolymer having either hydroxyl or isocyanate termination. As previously mentioned, a triol or triisocyanate is then used for crosslinking to prepare the final polymer.

The polyols used to prepare the useful polyurethane prepolymers include polyhydroxy ethers (substituted or unsubstituted polyalkylene ether glycols or polyhydroxy polyalkylene ethers), ethylene oxide or propylene oxide adducts of polyols, polyhydroxy polyesters, polycaprolactones, etc. The diisocyanates used to prepare the useful prepolymers are aromatic diisocyanates such as toluene diisocyanate, ethylbenzene diisocyanate, xylene diisocyanate, methyldiphenyl methane diisocyanate, dimethyldiphenylmethane diisocyanate, dichloroxylene diisocyanate, dimethoxybiphenyl diisocyanate, and others.

The polyol and diisocyanate reaction to provide useful prepolymers can provide either hydroxyl or isocyanate terminated prepolymers. That is, either polyisocyanate or polyol is used in excess such that the final prepolymer contains either isocyanate or hydroxyl polyfunctionality. Hydroxyl terminated prepolymers are preferred because they are considerably more stable than isocyanate terminated prepolymers and may be readily stored for future use without fear of spontaneous crosslinking. Various methods of preparing these prepolymers are known in the art, preferred techniques and prepolymers being shown in the examples appended hereto.

The cross-linking agents utilized with the above described prepolymers to provide the urethane polymers used in making the pressure-sensitive adhesives of the invention are of two general types. When an isocyanate terminated prepolymer is utilized, the curing agent is a polymeric triol having a molecular weight between about 1,000 and 5,000, preferably between about 1,500 and about 3,000. Such triols are commonly obtained by extending a triol such as glycerine, trimethylol propane, 1,2,6-hexane triol, etc. with propylene oxide, ethylene oxide or both. When a hydroxyl terminated polyurethane prepolymer is utilized, the crosslinking agent is a triisocyanate such as that obtained by the reaction of trimethylol propane and toluene diisocyanate in an NCO to hydroxyl ratio of 2:1, triphenylmethane triisocynate, or 2,4,4'-triisocyanato diphenylether.

Another technique or method of obtaining the polyurethane polymers used to make the adhesive of the invention is to react high molecular weight polyols with diisocyanate to provide a polymer which is then crosslinked with either triisocyanate or triol to obtain the polyurethane polymer used to prepare the pressure-sensitive adhesives of the invention. This procedure can be reversed, if desired, and high molecular weight diisocyanates reacted with diols.

The tackifiers utilized in the compositions of the invention comprise the reaction product of cyclic terpene alcohols and aromatic isocyanates. Typical starting materials for such reaction products include the aromatic diisocyanates and the tricyclic diterpene alcohol described in U.S. Pat. No. 2,867,644 as a mixture of 14 to 23 percent abietyl alcohol, 36 to 39 percent dihydro abietyl alcohol, and 39 to 50 percent of tetrahydro abietyl alcohol. Other suitable cyclic terpene alcohols for preparing the tackifiers are such as $\alpha$-terpineol, geraniol, citronellol, abietyl alcohol, dihydroabietyl alcohol, tetrahydroabietyl alcohol, dehydroabietyl alcohol, 2-hydroxy-methyl-5-norborene, 6,6-dimethyl bicyclo (3,1,1)-2-heptene-2-ethanol, $\beta$-terpineol, gamma terpineol, dihydro-$\alpha$-terpineol, menthol, neomenthol, fenchyl alcohol, borneol, isoborneol.

If desired, some polyhydric alcohols may be incorporated in the tackifier together with the cyclic terpene alcohol. Preferably, at least about 50 percent by weight of the alcohols should be terpene alcohol. Examples of polyhydric alcohols that may be used in preparing the tackifier are such as trimethylol propane, trimethylolethane, penta-erythritol, sorbitol, mannitol, 1,2,6-hexanetriol, diethylene glycol, dipropylene glycol, tripropylene glycol, dipentaerthritol, glycerol, glycerinepropylene oxide adducts, 1,2,6-hexanetriol-propylene oxide adducts, ethylene glycol, propylene glycol, tetramethylene glycol, tris (dipropylene glycol) phosphite, etc.

The isocyanates useful for reaction with cyclic terpene alcohols for preparing the tackifiers utilized in the invention are such as toluene diisocyanate, triphenylmethane triisocyanate (Mondur TM), methylene bis (4-phenylisocyanate), hexamethylene diisocyanate, 3,3'-dimethoxy-4,4'-diphenylene diisocyanate, 4-methoxy-1,3-phenylene diisocyanate, poly(phenylmethylene) triisocyanate (PAPI), 1,5-naphthalene diisocyanate, the reaction product of toluene diisocyanate with trimethylol propane at an NCO/OH ratio of 2:1 (Mondur CB), phenyl isocyanate, p-tolyl isocyanate, m-chlorophenyl isocyanate, naphthyl isocyanate, etc.

The ratio of isocyanate to hydroxyl equivalents in preparing the tackifier is about 0.5 to about 1.25, preferably about 0.9 to about 1.1. Thus, the tackifier may be either isocyanate or alcohol terminated in which case the tackifier is reactive with the polyurethane polymer is preparing an adhesive. If desired, the tackifier may be reacted with monohydric alcohols or amines to provide a non-reactive tackifier.

These tackifiers have been found effective with the previously described polyurethanes to provide excellent pressure-sensitive adhesives. However, these tackifiers have not been found effective with natural rubber or styrene-butadiene rubbers to provide pressure-sensitive adhesives. Use of these tackifiers with polyurethanes other than those described herein have not been found to be satisfactory pressure-sensitive adhesives.

The finished adhesive to be effective as a pressure-sensitive adhesive and contain the aforementioned balance of properties should contain about 20 to about 75, preferably about 35 to about 65 parts by weight of tackifier per 100 parts by weight of urethane polymer. The ratios of isocyanate: hydroxyl groups in the composition of reactants making up the final adhesive composition should be approximately stoichiometric (i.e., NCO:OH ratio of $1.0 \pm 0.2$) regardless of the source of the isocyanate or hydroxyl.

In practice, the adhesive components are combined in a solvent, coated on a desired substrate, surface, or backing and cured in situ in a drying oven. The reaction is preferably accelerated and catalyzed by use of about 0.1 gm per equivalent of isocyanate of a catalyst such as lead 2-ethylhexoate, stannous 2-ethylhexoate, dibutyl tin dilaurate, or other common urethane catalyst. When a catalyst is used, the curing time is approximately ten minutes or less at 190°–300° F. If desired, antioxidants such as those disclosed in U.S. PAT. No. 3,494,880 may be incorporated in the adhesive composition. The solvents utilized in coating the adhesive composition are those which dissolve the polyurethane polymer and are such as aromatic hydrocarbons, ketones, ethers, esters, or aliphatic or cycloaliphatic organic solvents. Specific examples are toluene, benzene xylene, methyl ethyl ketone, ethyl acetate, cellosolve acetate, dimethyl ether of ethylene glycol, heptane, cyclohexane, dioxane, etc. The non-volatile content utilized is dependent upon the viscosity and coating weight desired and is that which provides a solution viscosity that is readily coatable upon a tape backing by conventional tape coating equipment. Polyurethane adhesives may be utilized in high solids solutions thereby minimizing pollution problems and effecting a cost saving.

The aforedescribed adhesive compositions may be coated upon numerous types of self-supporting backings to provide adhesive tapes. Such backings may be polymeric films such as polyethylene terephthalate, polyvinyl chloride, cellulose acetate, etc. Impregnated cellulosic materials may be utilized to prepare paper backed masking tapes. It is also possible to prepare transfer films by coating the adhesive composition of the invention on release liners such as silicone coated papers.

The following examples in which all parts are by weight unless otherwise noted, illustrate preparation of the polymers, tackifiers, and adhesives of this invention, without limiting the scope thereof.

DESCRIPTION OF THE PREFERRED EMBODIMENTS

Examples 1–12

These examples illustrate preparation of the tackifier resins utilized in the pressure sensitive adhesives of the invention. Resin softening points were determined in accordance with ASTM E28-58T.

Example 1

1 gm. equivalent weight of a mixture of terpene alcohols comprising about 14 to 23 percent abietyl alcohol, 36 to 39 percent dihydro abietyl alcohol, and 39 to 50 percent tetrahydro abietyl alcohol (commercially available from Hercules, Inc. under the trade designation "Abitol") was placed in a three-neck round-bottom reaction flask fitted with mechanical stirrer, thermometer, nitrogen inlet tube, and dropping funnel. The terpene alcohol was heated to 100° C and one equivalent of toluene diisocyanate (TDI) slowly added from the dropping funnel. The reaction temperature was allowed to increase to 170°–180° C and the mixture stirred for about 3 hours. Then, the resin was poured into a flat pan and allowed to harden. The resin was found to have a softening point of about 95° C.

Example 2

0.8 equivalent of the terpene alcohol used in Example 1 and 1.0 equivalent of toluene diisocyanate were reacted by the procedure of Example 1. The product had a softening point of 91° C.

Example 3

2.0 equivalents of the terpene alcohol used in Example 1 and 1.0 equivalent of toluene diisocyanate were reacted by the procedure used in Example 1. A resin was obtained having a softening point of 51° C.

Example 4

1.0 equivalent of the terpene alcohol used in Example 1 and 1.0 equivalent of methylene-bis-(4-phenyl-isocyanate) were placed together in a flask similar to that used in Example 1, the mixture heated, with stirring, to effect the dissolution of the isocyanate in the terpene alcohol. The temperature was allowed to rise to about 170°–180° C., the mixture stirred for about 3 hours, and the product was poured into a flat pan. A resin having a softening point of about 99° C. was obtained.

Example 5

0.8 equivalent of the terpene alcohol used in Example 1 and 0.3 equivalent of the triisocyanate reaction product from one equivalent of trimethylol propane and two equivalents of toluene diisocyanate (commercially available from Mobay Chemical Co. under the trade designation "Mondur CB") were placed together in a three-necked round-bottom flask like the one used in Example 1. The temperature was raised to 100° C, with stirring, and 0.5 equivalent of toluene diisocyanate added dropwise. After 3 hours the temperature had risen to 190° C. at which time the resin was poured out. It had a softening point of 102° C.

Example 6

0.4 equivalent of the terpene alcohol used in Example 1 and 0.4 equivalent of polypropylene glycol having a molecular weight of 400 were placed in the three-necked round-bottom flask used in Example 1. The temperature was allowed to rise to 100° C. and 0.8 equivalent of toluene diisocyanate added dropwise in a nitrogen atmosphere. The temperature was raised to 160° C., maintained for 3 hours, and the resin poured out. The product had a softening point of 75° C.

Example 7

0.6 equivalent of the terpene alcohol used in Example 1 and 0.2 equivalent of polyethylene glycol having a molecular weight of 400 were reacted with 0.8 equivalent of toluene diisocyanate as described in Example 6. The product had a softening point of 78° C.

Example 8

0.3 equivalent of the terpene alcohol used in Example 1 and 0.02 equivalent of polycaprolactone having a molecular weight of 2,000 were reacted with 0.32 equivalent of toluene diisocyanate as described in Example 6. A resinous product was obtained having softening point of 73° C.

Example 9

0.9 equivalent of the terpene alcohol used in Example 1 and 1.5 equivalents of trimethylol propane were heated together to 80° C. in a three-necked round-bottom flask equipped as in Example 1. 2.5 equivalents of toluene diisocyanate were added dropwise. The reaction temperature was allowed to rise to 190° C. and the product poured into a flat pan. The softening point was 115° C.

Example 10

1 equivalent of 2-hydroxymethyl-5-norbornene and 1.0 equivalent of toluene diisocyanate were reacted as in Example 1. A resinous product having a softening point of 69° C. was obtained.

Example 11

A sample of tackifier comprising the reaction product of toluene diisocyanate and the terpene alcohols used in Example 1 ("Abitol") and having a slight stoichiometric excess of the diisocyanate (commercially available from Schenectady Chemicals, Inc. under the trade designation "Isoterp 95") was reacted at 150° F. for about 2 hours with sufficient polypropylene glycol having a molecular weight of 2,700, in the presence of lead octoate catalyst, to react the excess isocyanate. Sufficient toluene was utilized to provide a 50 percent solids solution. Upon completion of the reaction, the resinous product was poured into a pan and dried.

Example 12

A sample of the tackifier used in Example 11 ('-'Isoterp 95") was reacted in a 50 percent solids toluene solution with sufficient dibutyl amine to react the excess isocyanate in the resin. Following reaction, the resin was poured into a pan and dried.

Examples 13-25

These examples illustrate preparation and evaluation of pressure-sensitive polyurethane adhesives utilizing the tackifiers prepared in Examples 1-12.

A hydroxyl terminated polyurethane prepolymer was prepared by reacting 419 parts by weight of a polypropylene oxide-ethylene oxide block copolymer having 10 percent polyoxyethylene groups and a hydroxyl value of 44.5 (commercially available from the Wyandotte Chemical Company under the trade designation "Pluronic L-81") with 120 parts of a pre-prepolymer comprising poly(tetramethylene glycol) and toluene diisocyanate and having an amine equivalent weight of 650 (commercially available from E. I. DuPont de Nemours & Co., Inc. under the trade designation "Adiprene L-167"). The reaction was catalyzed with 15 parts by weight of a 5 percent lead octoate solution. Sufficient toluene was added to provide a 70 percent solids polymer solution. The solution viscosity after standing at room temperature for 24 hours was 9,600 cps.

Adhesives were prepared as shown in Table I by combining (1) 40.32 parts by weight of the above polyurethane prepolymer with (2) 2.0 parts by weight of crosslinking agent having an isocyanate content of 10 percent and comprising a triisocyanate made from 1 equivalent of trimethylol propane and two equivalents of toluene diisocyanate (commercially available from the Mobay Chemical Company under the trade designation "Mondur CB"), and (3) tackifier from Examples 1-12 as shown in Table I, the tackifier being dissolved in toluene to form a 50 percent solution by weight.

Each of the adhesive compositions was coated on biaxially oriented 1.5 mil polyethylene terephthalate film and cured at 250° F. for 10 minutes. Tapes were prepared by cutting the coated adhesive sheets into ½ inch wide strips and the peel and shear strength determined in accordance with "Pressure Sensitive Tape Council" tests 1 and 7. The shear strength was obtained using a ½ × ½ inch bond of adhesive on a stainless steel panel and a load of 1,000 gms.

Quick stick of each adhesive was determined by allowing about a 1 inch length of a 10 inch closed loop of 1 inch wide tape to come in contact with a clean 4 inches × 8 inches × ¼ inch glass plate, no pressure being used other than the weight of the tape. If the adhesive will support the weight of the glass plate, the adhesive is considered to have excellent quick stick. Each of the polyurethane adhesives of Examples 13-25 supported the glass plate, whereas a commercial solvent-resistant acrylate adhesive failed to support the glass plate.

Quick stick of each adhesive was also evaluated by means of PSTC-6 modified to utilize a 1 inch diameter (80 gm) ball. Solvent-resistant acrylate adhesives permit the ball to roll a minimum of about 18 inches. The polyurethane adhesives of Examples 13-25 only permitted the ball to roll about 3 inches, this being about the same distance obtained with rubber-resin adhesives.

A sample of each of the tapes of Examples 13-25 was adhered to a steel panel and immersed in an agitated heptane bath for 24 hours at room temperature. Tapes made with rubber-resin and acrylate adhesives were similarly bonded to steel panels and immersed in heptane. In each instance, the rubber resin adhesive was dissolved so the tape fell from the steel plate. The acrylate adhesive was softened and peeled easily from the steel plate. The polyurethane adhesives were only slightly softened at the edges of the tape backing, the peel adhesion being firm and steady.

TABLE I

| Example | Tackifier | Tackifier Concentration (parts per 100 parts of polymer) | Peel Adhesion (oz./in.) | Shear Adhesion (minutes) |
|---|---|---|---|---|
| 13 | Example 1 | 50 | 26 | 10,000 + |
| 14 | Example 2 | 40 | 50 | |
| 15 | Example 3 | 40 | 38 | 127 |
| 16 | Example 4 | 50 | 24 | 10,000 + |
| 17 | Example 5 | 50 | 40 | 10,000 + |
| 18 | Example 6 | 50 | 26 | 10,000 + |
| 19 | Example 7 | 40 | 30 | 4,703 |
| 20 | Example 8 | 50 | 30 | 10,000 + |
| 21 | Example 9 | 50 | 64 | 10,000 + |
| 22 | Ex. 10 | 50 | 24 | |
| 23 | Ex. 11 | 50 | 26 | |
| 24 | Ex. 12 | 50 | 51 | 538 |
| 25 | (Control) | 0 | 2 | |

Example 26

This Example illustrates preparation of a pressure-sensitive polyurethane adhesive utilizing an isocyanate terminated polyurethane prepolymer and a polyol curing agent. 40.00 parts of a polyurethane pre-prepolymer having an equivalent weight of 1,000 and comprising poly(tetramethylene glycol) end-capped with toluene diisocyanate (commercially available from E. I. DuPont de Nemours & Co., Inc. under the trade designation "Adiprene L-100") was thoroughly mixed with 110.4 parts of a 50 percent toluene solution of tackifier resin prepared according to Example 1 to provide a solution containing about 65 parts by weight of tackifier per 100 parts by weight of urethane polymer. To this was added 27.36 parts of a polypropylene oxide-ethylene oxide block copolymer having 10 percent polyoxyethylene groups and a hydroxyl value of 44.5 (commercially available from Wyandotte Chemical Company under the trade designation "Pluronic L-81"), 71.58 parts of a triol comprising the addition product of trimethylol propane and propylene oxide and having a hydroxyl number of 63, (commercially available from Wyandotte Chemical Company under the trade designation "Pluracol TP2540"), 20.64 parts of toluene and 2.0 parts of a 5 percent solution of lead octoate in xylene. After thorough mixing, the solution was coated onto 1.5 mil polyester film and cured at approximately 200° F for 10 minutes. A firm, tacky adhesive was obtained.

The tape of this examples was subjected to a solvent resistant test (Federal specification L-T-100a) by applying a one inch wide strip of tape to a smooth, aluminum panel and immersing the panel for 24 hours in a mixture of solvents comprising 60 percent by volume of isooctane, 5 percent of benzene, 20 percent of toluene and 15 percent of xylene. Peel adhesion was measured on a tensile-testing machine (Instron) with the stressing jaw moving at a speed of 12 inches per minute. For comparison, two commercial adhesive tapes were tested under the same conditions — one having a natural rubber base and the other a phenol-formaldehyde resin cured SBR-Neoprene base. Results are reported in Table II. The polyurethane adhesive lifted the glass plate and stopped the steel ball in 3 ½ inches when subjected to the tests previously described.

TABLE II

SOLVENT RESISTANCE TEST

PEEL ADHESION (OZ. PER INCH)

| Adhesive | Initial | after 24 hrs Immersion in solvent |
|---|---|---|
| Natural rubber | 35 | 1 |
| Phenol-formaldehyde resin cured SBR-Neoprene | 57 | 6 |
| Polyurethane | 45 | 24 |

Example 27

This Example illustrates preparation of a pressure-sensitive polyurethane adhesive which is sensitive to water but still resistant to hydrocarbon solvents. The following materials were thoroughly mixed together:

112.0 parts of poly(ethylene glycol) of 1,000 molecular weight (commercially available from the Union Carbide Corporation under the trade designation "Carbowax 1000").

380.0 parts of polypropylene oxide-ethylene oxide block copolymer having 10 percent polyoxyethylene groups and a hydroxyl value of 44.5 (commercially available from the Wyandotte Chemical Company under the trade designation "Pluronic L-81").

39.0 parts of tolylene diisocyanate 212.3 parts of ethyl acetate 15.2 parts of a 5 percent toluene solution of lead octoate An exothermic reaction occurred which was allowed to continue without the application of external heat. After 24 hours the viscosity was 19,280 centipoises.

To 23.7 parts of the above prepolymer was added 1.0 part of a triisocyanate prepared from trimethylolpropane and toluene diisocyanate (commercially available from the Mobay Chemical Company under the trade designation "Mondur CB-60") 18.0 parts of a 50 percent toluene solution of the tackifier prepared in Example 1 was also added. After mixing, the solution was coated on a silicone coated release liner and cured at 250° F, a tacky film being formed. The adhesive was then transferred to label stock paper and labels applied to glass bottles. The pressure-sensitive labels could be removed quite readily from the glass by brief contact with water. In the absence of water, these labels could not be removed without delaminating the label. The adhesive possessed good quick stick and peel adhesion.

Examples 28-29

These Examples illustrate preparation of pressure-sensitive polyurethane adhesives utilizing high molecular weight polyols and isocyanates in the preparation of the urethane polymer.

Example 28

The following materials were thoroughly mixed together:

Part A 350.00 parts of polypropylene glycol having a molecular weight of about 2,000 and a hydroxy number of about 56.

70.70 parts of the addition product of trimethylolpropane and propylene oxide having a molecular weight of about 1,535 and a hydroxyl number of about 110.

12.25 parts of a 5 percent toluene solution of lead octoate 0.7 part 2,6-di-t-butyl-4-methylphenol anti-oxidant 0.7 part 2,4-dimethyl-6-t-butylphenol anti-oxidant Part B 278.00 parts of a 50 percent solution of the tackifier of Example 1 in heptane 42.63 parts of toluene diisocyanate Part A (216.3 parts) and Part B (160 parts) were mixed together just prior to coating on a vinyl film. Both sides of the vinyl were coated and the adhesive cured by passing the web through a three zone oven having temperatures of 150° F., 200° F., and 200° F. Total cure time was 10 minutes. The product exhibited a desirable limited bond build-up to natural rubber and possessed good quick stick, shear strength, and peel adhesion.

Example 29

The following were mixed together:

69.0 parts of isocyanate terminated urethane polymer comprising poly(tetramethylene glycol) and toluene diisocyanate and having an amine equivalent weight of 650.

90.0 parts of polypropylene glycol having a molecular weight of about 2000 and a hydroxyl number of about 56.

8.8 parts of the addition product of trimethylolpropane and propylene oxide having a molecular weight of about 1535 and a hydroxyl number of about 110.

To 10 parts of this master batch was added 8 parts of a 50 percent toluene solution of the tackifier of Example 12 and 0.3 part of a 5 percent toluene solution of lead octoate. The solution was coated on polyester and cured for 10 minutes at 200° F. An adhesive with good quick stick, peel adhesion, and shear strength was obtained.

Example 30

This Example illustrates use of "Nopol" in preparing a tackifying resin and use of the resin in polyurethane adhesives. One equivalent of 6,6-dimethyl bicyclo (3,1,1)-2-heptene-2-ethanol (commercially available from the Glidden-Durkee Co. under the trade designation "Nopol") was heated to 50° C. and one equivalent of toluene diisocyanate added dropwise with the temperature being allowed to rise to about 180° C. The resin was then poured into a pan and found to have a softening point of about 50° C. A hydroxyl-terminated prepolymer was prepared by reacting 170.1 parts by weight of a polypropylene oxide-ethylene block copolymer having 10 percent polyoxy ethylene groups and a hydroxyl value of 41.5 (commercially available from the Wyandotte Chemical Company under the trade designation "Pluronic L-81") with 63.4 parts of a poly(tetramethylene glycol)-toluene diisocyanate adduct having an amine equivalent weight of 660 (commercially available from DuPont under the trade designation "Adiprene L-167"). The reaction was catalyzed with 5.7 parts by weight of a 5 percent lead octoate solution. Additional toluene, 94.4 parts by weight, brought the solution to 70 percent solids. The solution viscosity after standing at room temperature for 24 hours was 36,250 cps.

An adhesive was prepared by combining (1) 55.6 parts by weight of the above hydroxyl-terminated prepolymer with (2) 2.0 parts by weight of cross-linking agent having an isocyanate content of about 10 percent and comprising a triisocyanate made from 1 equivalent of trimethylol propane and 2 equivalents of toluene diisocyanate (commercially available from the Mobay Chemical Company under the trade designation "Mondur CB") and (3) 40.0 parts by weight of a 50 percent solution of the tackifier prepared above in toluene. Similar adhesives were made with the same weight ratios but with the tackifier of Example 1 and Example 5. Tapes were prepared as described in Examples 13–25 and evaluated as therein described. Peel and shear adhesion data are given in Table III. Each of the tackified adhesives lifted the glass plate, stopped the large steel ball within 3 inches, and were resistant to heptane solvent.

TABLE III

| Tackifier | Tackifier conc. (phr) | Peel Adhesion (oz/inch) | Shear Adhesion (minutes) |
| --- | --- | --- | --- |
| None (control) | 0 | 6 | |
| from Example 1 | 50 | 53 | 10,000 + |
| From Example 30 | 50 | 54 | 85 |
| From Example 5 | 50 | 44 | 10,000 + |

What is claimed is:

1. A polyurethane pressure-sensitive adhesive comprising a crosslinked polyurethane and a tackifier for said crosslinked polyurethane, said crosslinked polyurethane being a cured reaction product of components comprising a polyol and a polyisocyanate, said crosslinked polyurethane having a molecular weight between crosslinks of 6,000 to 40,000 and a urethane group concentration of 0.7 to 1.3 urethane groups per 1,000 grams of said crosslinked polyurethane, said tackifier comprising a resin which is the reaction product of the components comprising a cyclic terpene alcohol and an aromatic polyisocyanate, said resin having been combined with said crosslinked polyurethane prior to the completion of the curing of said crosslinked polyurethane.

2. Pressure-sensitive adhesive according to claim 1 wherein said pressure-sensitive adhesive contains 20 – 75 parts by weight of said resin per 100 parts by weight of said crosslinked polyurethane.

3. Pressure-sensitive adhesive according to claim 1 wherein said resin is isocyanate-terminated.

4. Pressure-sensitive adhesive according to claim 3 wherein said resin is combined and reacted with said crosslinked polyurethane prior to the completion of the curing of said crosslinked polyurethane.

5. Pressure-sensitive adhesive according to claim 3 wherein said resin has been rendered nonreactive by reaction with a monohydric alcohol or amine.

6. Pressure-sensitive adhesive according to claim 1 wherein the isocyanate:hydroxyl ratio in the reactants making up the pressure-sensitive adhesive composition, regardless of the source of the isocyanate or the hydroxyl radicals, is $1.0 \pm 0.2$.

7. Pressure-sensitive adhesive according to claim 1 wherein said resin is in the reaction product of an aromatic diisocyanate and a cyclic terpene alcohol and a polymeric diol or triol in the ratio of 0.8 to 2.0 equivalents of OH per equivalent of NCO.

8. Pressure-sensitive adhesive according to claim 1 wherein said crosslinked polyurethane consists essentially of the reaction product of at least one polyhydroxyl-terminated polyether or polyester, at least one diisocyanate, and at least one triisocyanate.

9. Pressure-sensitive adhesive according to claim 1 wherein said crosslinked polyurethane consists essentially of the reaction product of at least one diisocyanate, at least one diol, and at least one triol.

10. Pressure-sensitive adhesive according to claim 8 wherein said polyhydroxyl-terminated polyether is a polyalkylene-ether glycol.

11. Pressure-sensitive adhesive according to claim 8 wherein said polyhydroxyl-terminated polyester is polycaprolactone polyester.

12. Pressure-sensitive adhesive according to claim 8 wherein said diisocyanate is the reaction product of poly(tetramethylene glycol) and toluene diisocyanate and has a molecular weight in the range of 1,000 to 2,500.

13. Pressure-sensitive adhesive according to claim 1 wherein said crosslinked polyurethane is the reaction product of (1) a polymeric triol having a molecular weight in the range of 1,000 – 5,000 and (2) an aromatic diisocyanate prepolymer containing polymeric chains having a molecular weight in the range of 400 to 4,000, and wherein said crosslinked polyurethane is combined and reacted with said resin prior to the completion of the curing of aaid crosslinked polyurethane.

14. Pressure-sensitive adhesive according to claim 1 wherein said crosslinked polyurethane is the reaction product of (1) a triisocyanate, (2) a hydroxyl-terminated polyurethane prepolymer containing polymeric chains having a molecular weight in the range of 400 to 4,000, and wherein said crosslinked polyurethane is combined and reacted with said resin.

15. Pressure-sensitive adhesive according to claim 14 wherein said triisocyanate is the reaction product of trimethylolpropane and toluene diisocyanate in an NCO:OH equivalents ration of 2:1.

16. Pressure-sensitive adhesive according to claim 9 wherein said diol is a block polymer of propylene oxide and ethylene oxide, or a poly(propylene glycol) having a hydroxyl number in the range of 40 – 50, or a mixture thereof.

17. Pressure-sensitive adhesive according to claim 9 wherein the polymeric triol used to form said crosslinked polyurethane is the addition product of trimethylol propane and propylene oxide.

18. Pressure-sensitive adhesive according to claim 1 wherein the said cyclic terpene alcohol is a mixture of abietyl alcohol, dihydroabietyl alcohol, and tetrahydroabietyl alcohol.

19. An article comprising a pressure-sensitive adhesive according to claim 1 coated onto at least one major surface of a substrate and cured in situ thereon.

20. An article according to claim 19 wherein said substrate is a flexible self-supporting sheet backing.

21. A method of making a polyurethane pressure-sensitive adhesive comprising the steps of
   1. combining a tackifier with a reaction mixture containing a di-hydroxyl or di-isocyanate-terminated polyurethane prepolymer and an amount of a polyol or polyisocyanate cross-linking agent composition sufficient to provide a crosslinked polyurethane with a molecular weight between crosslinks of 6,000 to 40,000 and a urethane group concentration of 0.7 to 1.3 urethane groups per 1,000 grams of crosslinked polyurethane, said tackifier comprising a resin which is the reaction product of the components comprising at least one polyisocyanate and at least one terpene alcohol; and then
   2. substantially fully curing the said reaction mixture by heating said reaction mixture in the presence of a suitable catalyst at an oven temperature in the range of 190° – 300° F. for not more than ten minutes but until said reaction mixture has cured to a crosslinked polyurethane having a molecular weight between crosslinks of 6,000 to 40,000 and a urethane group concentration of 0.7 to 1.3 urethane groups per 1,000 grams of crosslinked polyurethane.

22. A method according to claim 21 wherein the resulting combination of said reaction mixture and said tackifier is coated onto a substrate prior to the heating step and the curing takes place in situ on said substrate.

23. A method according to claim 21 wherein said resin is isocyanate-terminated and is caused to react with the said reaction mixture during the heating step.

24. A method according to claim 22 wherein said resin is non-reactive and does not react with said reaction mixture during the heating step.

* * * * *